US008232869B2

(12) United States Patent
Bennett

(10) Patent No.: US 8,232,869 B2
(45) Date of Patent: Jul. 31, 2012

(54) IDENTIFYING A PLURALITY OF DEVICES

(75) Inventor: Steven Ian Bennett, Sunbury-on-Thames (GB)

(73) Assignee: Thorn Security Limited, Sunbury-on-Thames, Middlesex (GB)

( * ) Notice: Subject to any disclaimer, the term of this patent is extended or adjusted under 35 U.S.C. 154(b) by 223 days.

(21) Appl. No.: 12/688,531

(22) Filed: Jan. 15, 2010

(65) Prior Publication Data

US 2010/0176931 A1    Jul. 15, 2010

(30) Foreign Application Priority Data

Jul. 16, 2007 (GB) .................................. 0713770.6
Jul. 16, 2008 (WO) ................ PCT/GB2008/002424

(51) Int. Cl.
*H04Q 5/22* (2006.01)
(52) U.S. Cl. .......... 340/10.4; 340/10.1; 710/9; 710/104; 710/110
(58) Field of Classification Search ................ 340/10.4, 340/10.1; 710/9, 110, 104
See application file for complete search history.

(56) References Cited

U.S. PATENT DOCUMENTS

| 5,465,251 | A | * | 11/1995 | Judd et al. ....................... 370/351 |
| 5,995,016 | A | * | 11/1999 | Perino ............................... 340/2.4 |
| 6,009,479 | A | * | 12/1999 | Jeffries ............................... 710/8 |
| 2002/0080032 | A1 | * | 6/2002 | Smith et al. ................. 340/572.1 |
| 2006/0214773 | A1 | * | 9/2006 | Wagner et al. ................ 340/10.2 |
| 2006/0277309 | A1 | * | 12/2006 | Eaton ............................. 709/227 |
| 2006/0288002 | A1 | * | 12/2006 | Epstein et al. ..................... 707/6 |
| 2007/0156840 | A1 | * | 7/2007 | Bashford et al. .............. 709/217 |
| 2007/0294443 | A1 | * | 12/2007 | Berenbaum et al. .......... 710/104 |

FOREIGN PATENT DOCUMENTS

| DE | 102 40 832 A1 | 3/2004 |
| DE | 103 29 420 A1 | 1/2005 |
| EP | 0 221 303 A | 5/1987 |
| EP | 0 485 878 A1 | 5/1992 |
| EP | 0 493 905 A | 7/1992 |
| GB | 2 456 743 A | 7/2009 |
| WO | WO 2009/010745 A1 | 1/2009 |

OTHER PUBLICATIONS

International Search Report dated Oct. 24, 2008 from PCT/GB2008/002424 (3 pgs).

* cited by examiner

*Primary Examiner* — Jennifer Mehmood
*Assistant Examiner* — Naomi Small
(74) *Attorney, Agent, or Firm* — Brinks Hofer Gilson & Lione

(57) ABSTRACT

A method and apparatus of identifying a plurality of devices connected along a common communications link is disclosed. A control station scans the devices by sending a succession of interrogation signals along the communication link, the interrogation signals including representation of the identification numbers of the devices. A first scan is carried out with interrogation signals identifying a first level of the range of identification numbers, and each device is programmed to generate, and to send to the control station, a response signal that includes its complete identification number and a checksum, upon receipt of a scan signal applicable thereto. Successive scans are carried out by the control station, adding the next higher level or the range of identification numbers, wherein upon completion of the scan that does not give rise to valid responses, the previously-paused scan is resumed.

16 Claims, 3 Drawing Sheets

BLOCK DIAGRAM OF EXAMPLE AUTO ADDRESSING SYSTEM

BLOCK DIAGRAM OF EXAMPLE AUTO ADDRESSING SYSTEM

IDENTIFYING A PLURALITY OF DEVICES

CROSS-REFERENCE TO RELATED APPLICATIONS

This application claims the benefit, under 35 U.S.C. §§120 and 365, of the filing date of Jul. 16, 2008 of PCT application No. PCT/GB2008/002424 filed on Jul. 16, 2008 (published as WO 2009/010745 A1), which claims the benefit of UK Application No. 0713770.6 filed on Jul. 16, 2007 (published as GB 2 456 743 A). The application further claims the benefit, under 35 U.S.C. §119, of the filing date of Jul. 16, 2007 of UK Application No. 0713770.6 filed on Jul. 16, 2007 (published as GB 2 456 743 A). PCT application No. PCT/GB2008/002424 filed on Jul. 16, 2008 (published as WO 2009/010745 A1) and UK Application No. 0713770.6 filed on Jul. 16, 2007 (published as GB 2 456 743 A) are incorporated by reference herein in their entirety.

BACKGROUND

1. Technical Field

This invention generally relates to a method of identifying a plurality of devices bearing identification numbers. The invention finds particular, though not exclusive, application in identifying individual ones of a plurality of electrical devices, such as sensors.

2. Related Art

A room, building, factory or other industrial plant may be provided with a plurality of electrical devices such as sensors, which devices may be controlled from a central location. For example, a large number of fire detectors may be distributed throughout an oil refinery. Such devices may be similar to each other, may be programmed to an identical default state so that detectors of the same type will leave the factory with a common default configuration (apart from their serial numbers), and yet (some at least) may need to be configured differently from each other. During manufacture, the devices are usually programmed with a unique serial number, there may be a very large quantity of such devices, differing only from one another by their serial numbers, all of which are of the same format. Any one operator could be expected to have a selection of such devices, perhaps of random serial numbers, or the devices may be connected at random into a detection system or an initially-ordered system may be disturbed in time by replacements. At any one time, therefore, the operator may have a quantity of devices whose actual serial numbers he may not know. When such a collection of devices is linked together by a common communications link from a central control station, it thus becomes very difficult to determine which serial numbers are available and with, for example electronically interrogating, which devices they are associated.

It is known to identify serial numbers and to associate them with respective electrical devices by dealing with the devices individually, for example by electronically interrogating the devices separate from the central control station, or by attaching one device at a time.

There is currently no practical method for an operator automatically to identify, maintain and enable hardware to communicate with multiple devices, all programmed to an identical default state, and all driven together from a common communications bus line. It is desirable that each unit be separately individually programmed with a user friendly unique 'address' code before connection to the common bus to enable data transfer to only the desired units. An address code is also preferable as less data bits will be required to communicate with the devices. This simplifies management of a system with many such devices.

A common method is to use the serial number as the identifying value. Mass produced devices must each have a long serial number to allow identification of each one over the life cycle of the product range, which can typically run into the tens to hundreds of millions. A significant overhead is needed to future proof the product. Hence, the serial number can run to many digits. On a typical system with different types of devices, some replaced, some as part of an extension, the serial numbers will become fragmented. These factors together result with an impractical way for an operator to identify and maintain a network of many of these devices.

It is also known to arrange for each device in turn to "break" the communications link and to "reattach" the connection to the next device when its serial number has been identified. However, this method requires the devices to be provided with hardware specifically for this purpose, becoming redundant once the identification and subsequent configuration has been effected. This results not only in an undesirable additional expense for the device, but also complication of the design and installation of the communications link.

It is also known to "scan" all the devices for each possible serial number from the known totality, or range, of serial numbers. A "scan" is understood to be the operation whereby a set of queries (master messages) is sent out by a control panel, each commanding that only the device with the matching serial number must reply (slave message). However, due to mass production, there may be a very large number of possible serial numbers that need to be scanned until a match is found, so the scanning could require an unacceptable amount of time to complete. Even though it is possible to arrange for there to be a delay in the sending of a matched identification signal back to the control panel to avoid a plurality of such messages colliding and disrupting the scanning, the quantity of possible serial numbers, together with the required tolerance of the timer within each device, still makes this approach too time consuming, and thus impractical.

SUMMARY

The present invention may provide a more practical method of identifying the serial numbers of a plurality of devices, and in particular to enable communication with, basic identification of, and rapid configuration of, multiple devices, all previously programmed to an identical default state (except for the serial number), and all driven together from a common communications bus line, without significant user intervention or reliance.

This invention may also reduce a factory-programmed, unchangeable serial number, this being the only feature unique to each unit, to a more practical form.

The present invention may provide a method of identifying a plurality of devices connected along a common communications link, wherein each device bears a unique identification number belonging to a defined range of such numbers, wherein a control station scans the devices by sending a succession of interrogation signals along the communication link, the interrogation signals comprising a representation of the identification numbers of the devices, wherein a first scan is carried out with interrogation signals identifying a first set of bits constituted by the least significant bits of the identification numbers, wherein each device is programmed to generate, and to send to the control station, a response signal that includes a checksum, upon receipt of a scan signal applicable thereto, wherein, in the event that two or more of the devices generate a response signal, the response signals will be deemed to be invalid by the control station, and the first scan is paused, wherein upon pausing of the first scan, the control station initiates a second scan comprising interrogation signals identifying a second set of bits constituted by the first set of bits and a further set of bits constituted by the next least significant bits of the identification numbers together, wherein successive scans are carried out by the control station, each successive scan adding yet a further set of bits constituted by the next least significant bits of the identification numbers, wherein upon completion of a scan that does not give rise to invalid responses, the previously-paused scan is resumed, wherein successive scans are carried out until, after all levels of the entire range of identification numbers have been scanned, only a single response is returned from any one complete scan, whereby the control station associates a unique identification number with each of the devices, and wherein, subsequent to identification of each of the devices by its unique identification number, the control station accords a simplified unique address number to each device for use in subsequent communication therewith.

Thus, the scanning carried out in accordance with the present invention results in the serial numbers of the devices being identified in a significantly reduced time compared with that required for known identification techniques, since scanning of all possible numbers is not required. By way of example, it is pointed out that if a serial number were 32 bits deep (in binary form), there would be approximately 4 billion possible serial numbers in that range.

The interrogation signals (master messages) sent from the control station contain a serial number (or at least part thereof) and command that only the device with the matching serial number (or at least a defined matching part) must generate a response signal (a slave message). The slave message from a device may begin immediately upon receipt of the master message, or otherwise within a predetermined minimum time, in order to ensure that if two or more devices do generate a response signal as a result of any one scan, they are treated as invalid responses by the control station. Invalid responses may be considered as "collisions". Upon detection of a collision, scanning is then continued at the next higher scanning level, and so on, until all collisions have been resolved and the control station has made a one-to-one association between devices and serial numbers. It will be appreciated that to attain this required outcome, the control station does not need to know the quantity of devices that are connected in the communications link.

Thus, the increased efficiency achieved, that is to say the reduced time required, by the scanning technique of the present invention, is based on the occurrence of collisions between response signals from the devices being scanned.

In addition to containing the complete serial number, the slave message reply advantageously includes a checksum or parity configuration, to ensure that the control station receives unintelligible data or an erroneous checksum when more than one device replies. Use of the checksum ensures that the control station can differentiate between, on the one hand, a non-response or a glitch/EMC event and, on the other hand, a valid uncorrupted response from a single device or a collision. A valid uncorrupted response from a single device results in scanning being continued at the next highest level without reversion to the previous scan level, whereas after a collision has been resolved, scanning reverts to the lower level at which it was paused.

In one embodiment of the present invention, a maximum of 250 devices are connected to a 2-wire communications loop, each device bearing a serial number 32 bits deep (in binary form). The first scan is carried out in respect of the lowest portion (least significant bits) of the serial number, since that is the most diverse, or random, in any given selection of devices. Thus, optimally only the lowest 10 bits are scanned initially, with bits 11-32 being ignored. This optimal scanning process ensures the minimal overall time to identify all the devices. Thus, using 10 bits for the first level scan will statistically yield the minimum overall scan time (assuming a preferred arrangement having between 20 and 250 devices to be identified). If 8 bits are used instead of 10 bits, the risk of collisions increases as does the requirement for many second level scans. If 12 bits are used instead of 10 bits, this will result in a very much longer first scan. In either case, therefore, the statistically average overall scan time will be longer than when using 10 bits. Statistically, approximately 64 collisions, representing around a 25% chance of a collision per master message, for a random set of bit values, may be expected. Should a data collision occur during a scan, the master message is modified by the addition of more bits of the serial number, whilst retaining the bits used in the message when the collision occurred. Thus, in this embodiment, the modified message will retain the last 10 bits of the serial number as a constant value, and bits 11 to 16 will be varied during the new, higher level scan. Thus, 64 master messages using a 16 bit address will form the new level scan. When that scan is complete, and in the event of no other collisions, the original 10 bit scan is resumed. On the other hand, should a data collision occur during the 16 bit scan, then that scan is paused and another scan is performed at a yet higher level using, in this embodiment, 24 bits of the serial number range, with the last 16 bits remaining the same. Thus, at this third scanning level, 256 master messages using a 24 bit serial number will form the scan. Statistically, the chance of a collision during this scan is vanishingly small, but should a collision occur then a further scan using all 32 bits of the serial number, with the last 24 bits remaining the same will form the new scan of 256 master messages using the full 32 bit serial number. In this way, with a maximum 250 devices involved, up to four levels of scan may be required.

It is possible when carrying out the method of the present invention that a large number of units may simultaneously attempt to reply to a master message. To avoid an overload and shutdown of the communications link, an algorithm is provided at the control station that, in this event, assumes that a data collision has occurred, whereby the communications link is maintained and the scanning directed to the next higher level as set out above.

The identification, or serial, numbers of the devices may be in the form of hexadecimal numbers, binary numbers or alpha numeric characters.

Subsequent to the identification of each of the devices by its unique identification number, the control station is arranged to accord a simplified unique address number to each device for use in subsequent communication therewith. It will be appreciated that such address number may have fewer characters than the manufacturer's assigned identification number, and may be in accordance with a required address system of the operator of the control station.

The driver of the data around the communication link, at the control station, will also be arranged to note that a scan error has occurred if the total number of devices identified exceeds the known actual number of devices that are connected thereto.

Having identified the plurality devices in accordance with the method of the present invention, the control panel is then in a position to communicate therewith in order to configure the devices in any required manner. In one embodiment of the invention, the devices comprise sensors, such as fire sensors, smoke sensors and temperature sensors, and the configuration may be in respect of the particular sensing function to be carried out by each sensor device. For each detector, once identified and addressed, its type can be identified remotely by the control station, thereby enabling configuration as appropriate. For example, the sensitivity of a device may be set by the control station, and this may differ from one device to another. The configuration may also involve ensuring that the sensor sends an alarm signal to the control station whenever the value of a parameter that is sensed has fallen to, or has exceeded a predetermined value. In the case where a sensing device comprises more than one sensor, possibly of different types, the configuration can arrange for each of them to respond accordingly, in a different manner from the other sensors of the same device.

The invention may also provide a sensing system comprising a control station and a plurality of sensors connected together along a communications link, wherein each sensor bears a unique identification number belonging to a defined range of such numbers, wherein the control station is arranged to carry out a succession of scans of the sensors throughout the entire range of the identification numbers, thereby to identify the identification number of each sensor, a first scan being carried out with interrogation signals identifying a first set of bits constituted by the least significant bits of the identification numbers, and successive scans adding respective sets of bits constituted by successive next least significant bits of the identification numbers, wherein, upon a match between the scanning number and its identification number in any one scan, each sensor is arranged to send to the control station a response signal comprising its full identification number and a checksum, wherein, upon receipt of two or more response signals arising from any one scan, the control station is arranged to pause that scan and to proceed to the next scan until only one response is received from a higher scan, whereupon the preceding scan is resumed, wherein, subsequent to the association of unique identification numbers with the respective sensors, the control station is arranged to accord a unique simplified address number to each sensor for subsequent communication therewith, and wherein the control station then sends a signal to the sensors individually to effect their configuration with respect to the particular parameter being sensed.

It will be appreciated, that the sensing system of the present invention may be operated in accordance with the method thereof.

The present invention thus requires little or no extra hardware to be provided in the devices or in control and indicating equipment.

The devices to be identified can be placed in any order on the communications link, and the method is operable also when devices are located on spurs of the main link. The serial numbers of the devices may thus be in any order along the communications link.

It is also envisaged that extra data could be added to the slave messages to ensure the integrity of non-colliding messages, whilst maximising the corruption of collided messages. This may be by way of parity checking or checksum verification.

Furthermore, in accordance with the present invention, extra information can be added to the messages that could aid quick identification or configuration of a particular type of device without having to resend another message from the control station, thus enabling swift commissioning of the set of devices. For example, different devices could be configured for different sensing functions.

The number of scan combinations for each scanning step can be optimised to minimise the total scan time for a given number of devices. Thus, the more devices to be configured will lead to a larger initial scan range to achieve optimal identification time. Fewer devices will require a smaller initial scan.

It will also be appreciated that the present invention is suitable not only for identifying a totally fresh set of devices in a system, but can be used to identify additional or replacement devices in an already-operational system. In such an arrangement, those devices that have already been identified by the control station and have been given the unique address code (if applicable) may be arranged to send a response signal upon being scanned that includes the address code for that device, so that that response signal could be ignored by the control station during the scanning procedure.

It is preferred that all interrogation signals (master messages) have a form of parity or checksum confirmation to ensure the integrity of the data sent. However, this could lead to the undesirable effect of glitches on the communication loop inhibiting the response from a device when a scan is in progress, therefore resulting in that device not being identified. A glitch in the loop could result in a misinterpretation of one or more of the transmitted bits. Use of error checking methods will result in the checksum not matching that of the transmitted bits, so the message contents are discarded. In the case of a glitch in the master message, the devices which it is trying to communicate with will, instead, discard the message. As a result it does not respond or is not identified. To overcome this problem, when a scan has been completed, unidentified devices may be found by arranging for the control station to send out a global interrogation signal commanding that all unidentified devices respond. Should a large number of devices respond to such a global interrogation signal, it is envisaged that the scanning of the method of the present invention would have to be restarted from its base level, with an interrogation signal from the control station commanding that previously-identified devices should not sent response signals.

It is envisaged that the present invention may be encapsulated in a microprocessor for carrying out the scanning operations, and to be used particularly, though not exclusively, with fire sensors or other related devices, in combination with control and indicating equipment in the form of an analogue addressable fire panel.

BRIEF DESCRIPTION OF THE DRAWINGS

A method and system for identifying a plurality of devices, each in accordance with the present invention, will now be described, by way of example, with reference to the accompanying drawings in which.

DETAILED DESCRIPTION

Figure 1:
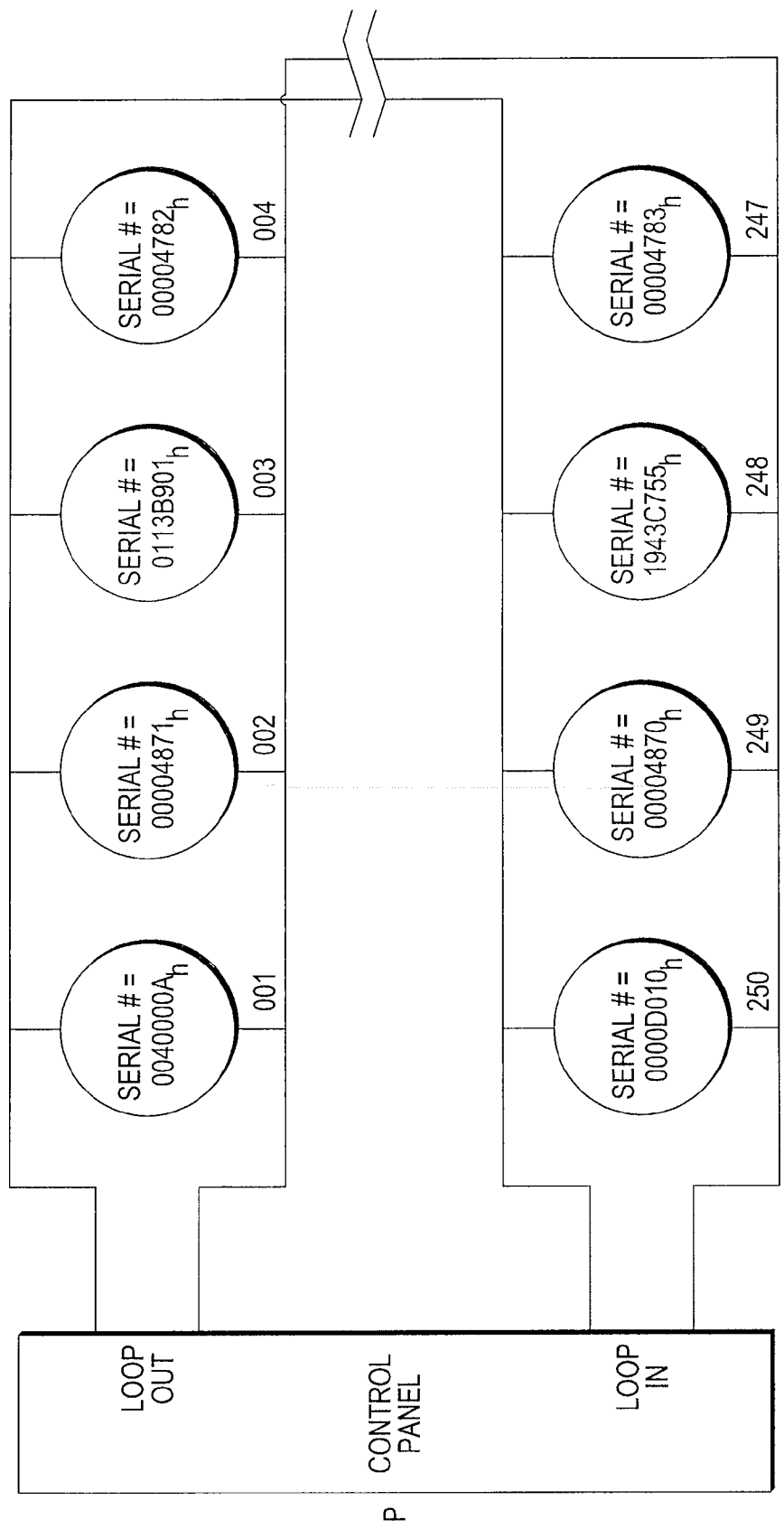
FIG. 1 is a block diagram of the sensing system.

Referring to FIG. 1, a control panel P is shown supplying a two wire communications loop, with 250 sensors, numbered 001, 002 . . . 249, 250, connected in parallel between the wires. As shown, each of the sensing devices 001 to 250 is provided with a unique serial number. Though FIG. 1 depicts 250 sensors, more or fewer sensors may be used. Further, the control panel P may communicate wirelessly with the sensors.

Figure 2:
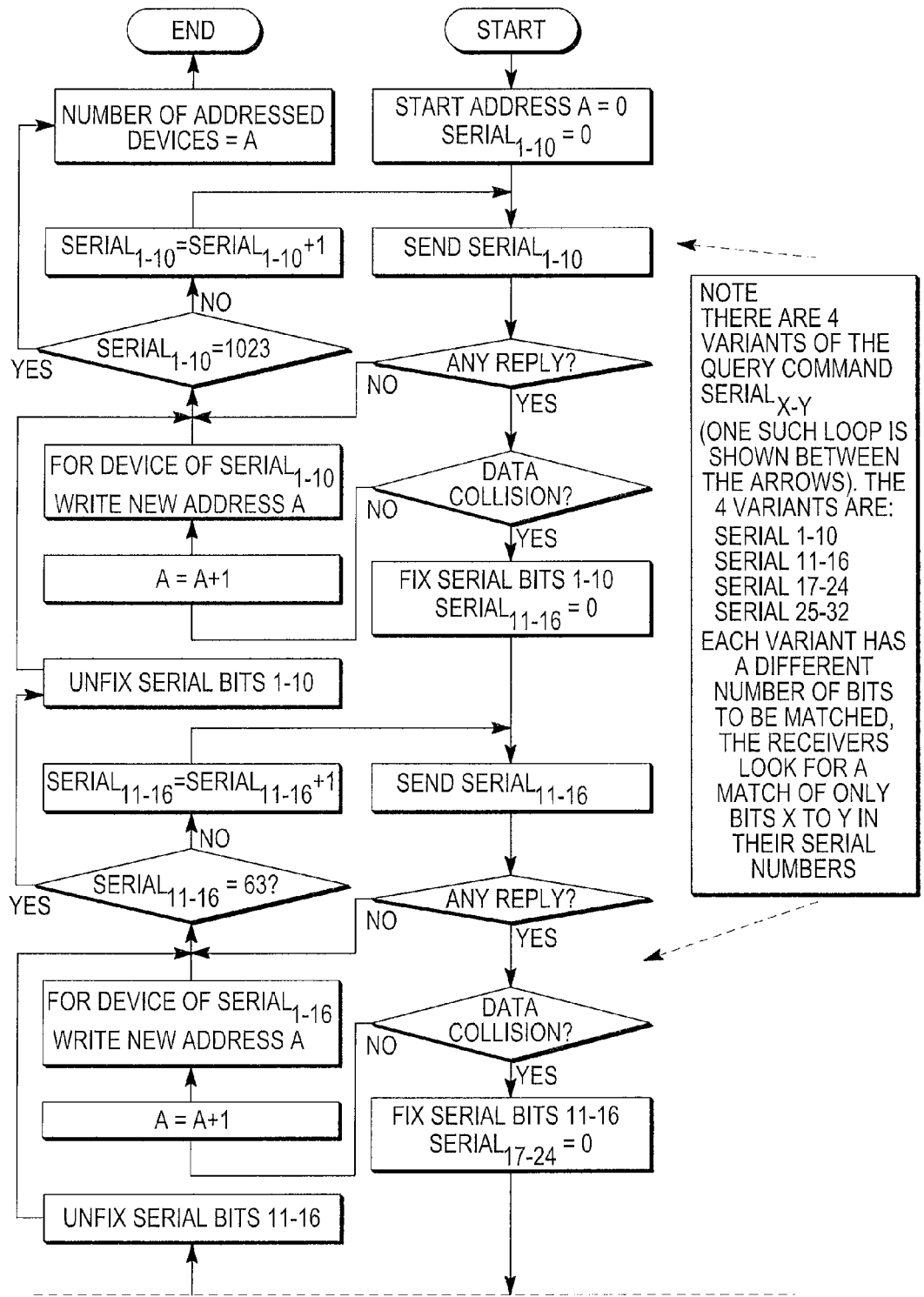
FIG. 2 is a flow chart of the identifying method.
Figure 2:
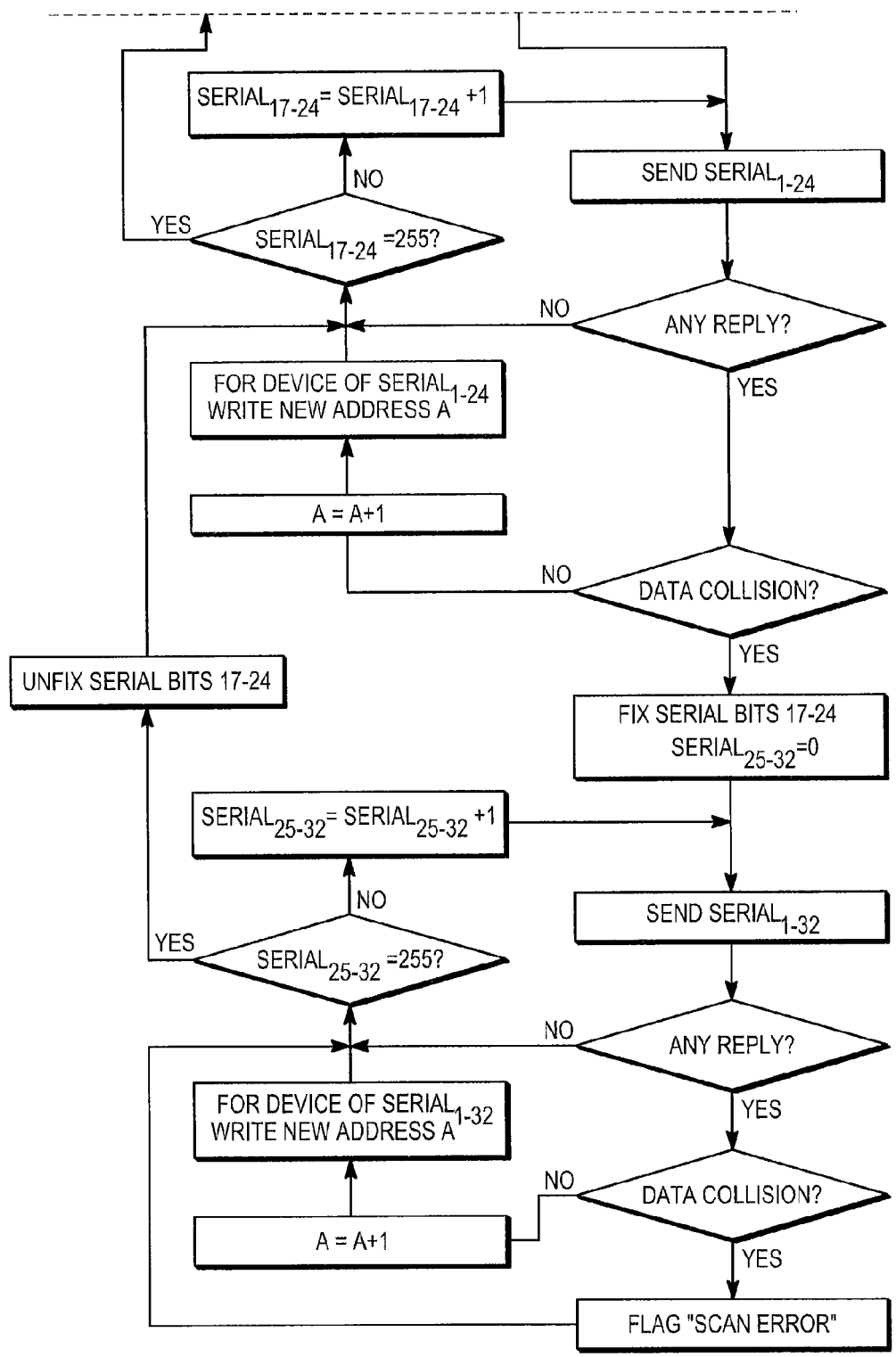

The identification of those serial numbers of the devices 001 to 250 by the control panel P is carried out by scanning in accordance with FIG. 2, which will now be described.

The control panel may include a processor (such as a microprocessor or other arithmetic logic device), a memory, and an I/O device. The memory may store one or more programs for performing the flow diagram in FIG. 2, as described below. The I/O device may be connected to the two wire communications loop and communicate with the 250 sensors.

The control panel P may send a serial number value to the sensors. The serial number value may be used by the sensors to compare against the full serial number as stored in the sensors. The serial number value may be compared to all or any part of the serial number (such as the least significant bits, the most significant bits, etc.).

To start, an address counter value "A" and the serial number value are set to $0000_{DEC}$ [Start address A=0, $Serial_{1-10}$=0]. The serial number is broadcast to all devices [Send $Serial_{1-10}$]. Any devices with their 32 bit serial number ending with 0000 will reply with their full serial number and checksum value. Assuming no devices have their serial number ending with 0000, there will be no reply [Any reply ?=NO]. The broadcast serial number 0000 is not the last in the sequence to be tested [$Serial_{1-10}$=1023=NO] hence the next serial number [$Serial_{1-10}$=+1] 0001 will be broadcast to all devices [Send $Serial_{1-10}$]. Any devices with their 32 bit serial number ending with 0001 will reply with their full serial number and checksum value. Assuming just 1 device has a serial number ending with 0001, there will be a reply [Any reply ?=YES] but no data corruption as indicated by the checksum data [Data collision ?=NO]. That device is next allocated the unique 'address' [A=A+1] [For device of $Serial_{1-10}$ Write new address A] by the control panel. The broadcast serial number 0001 is not the last to be tested [$Serial_{1-10}$=1023=NO] hence the next serial number [$Serial_{1-10}$=$Serial_{1-10}$+1] 0002 will be broadcast to all devices [Send $Serial_{1-10}$]. Any devices with their 32 bit serial number ending with 0002 will reply with their full serial number and checksum security value. Assuming two or more devices reply, the checksum received by the control panel will not correspond to the received message, and hence will be deemed to be invalid [Data collision ?=YES]. This being the case, this scan will be paused and the last 10 bits of the previously broadcast serial number will be fixed and a new scan will be initiated using bits 11-16 [Fix serial bits 1-10, $Serial_{11-16}$=0] as described here. Once that scan is complete the previous scan will be resumed continuing on with bits 1-10 and ignoring bits 11-16 [Unfix serial bits 1-10] using the next value [$Serial_{1-10}$=1023=NO][$Serial_{1-10}$=$Serial_{1-10}$+1] 0003. This will repeat until all combinations of the last 10 bits have been scanned [$Serial_{1-10}$=1023=YES] such that all devices will have been identified. Once all the devices have been individually identified (with a valid reply), the control panel P assigns (program to RAM or ROM) a simplified unique address number to each device, and communicates that number to each device individually. A scan error has occurred if the total number of identified devices does not match the actual number of device on a loop. The devices are, therefore, each configured with a simplified unique address number.

By way of example, the range of the serial numbers of the sensor devices 001 to 250 is taken to be:

00 00 00 00 to FF FF FF FF $_{LSB}$ (hex)

For reasons of simplicity of showing the preferred embodiment, the third byte of all the serial numbers is shown in binary form, e.g.:

00 00 (0000 0000) 00 to FF FF (1111 1111) FF $_{LSB}$

Assume that the system comprises only A to I devices, for simplicity in describing the scanning and its results, and that the devices have serial numbers, which are individually unknown to the control system, as follows:

Device A: 40 0B (0100 0000) 02
Device B: 0F 90 (0000 0000) 03
Device C: 17 33 (0100 0000) 06
Device D: 01 00 (0000 1000) 03
Device E: 22 60 (0000 1000) 03
Device F: 22 60 (0100 1000) 22
Device G: 01 45 (0110 1001) 66
Device H: 05 45 (0110 1001) 67
Device I: 02 45 (0110 1001) 66

The master messages sent out by the control panel P are as follows, where "x" denotes an insignificant character that may have any value, and which is disregarded:

| Scan level | Scan serial | Comment |
| --- | --- | --- |
| 1 - $Serial_{1-10}$ | xx xx (xxxx xx00) 00 | Start of scan |
| 1 - $Serial_{1-10}$ | xx xx (xxxx xx00) 01 | |
| 1 - $Serial_{1-10}$ | xx xx (xxxx xx00) 02 | Found device A, assign unique simplified address number |
| 1 - $Serial_{1-10}$ | xx xx (xxxx xx00) 03 | Devices B, D and E reply - data corruption |
| 2 - $Serial_{1-16}$ | xx xx (0000 0000) 03 | $2^{ND}$ level scan initiated. Found device B, assign unique simplified address number |
| 2 - $Serial_{1-16}$ | xx xx (0000 0100) 03 | |
| 2 - $Serial_{1-16}$ | xx xx (0000 1000) 03 | Devices D and E reply - data corruption |
| 3 - $Serial_{1-24}$ | xx 00 (0000 1000) 03 | $3^{RD}$ level scan initiated. Found device D, assign unique simplified address number |
| 3 - $Serial_{1-24}$ | xx 01 (0000 1000) 03 | |
| 3 - $Serial_{1-24}$ | | Scan though next 93 combinations |
| 3 - $Serial_{1-24}$ | xx 5F (0000 1000) 03 | |
| 3 - $Serial_{1-24}$ | xx 60 (0000 1000) 03 | Found device E, assign unique simplified address number |
| 3 - $Serial_{1-24}$ | xx 61 (0000 1000) 03 | |
| 3 - $Serial_{1-24}$ | | Scan though next 157 combinations |
| 3 - $Serial_{1-24}$ | xx FF (0000 1000) 03 | End of $3^{RD}$ level scan stage |
| 2 - $Serial_{1-16}$ | xx xx (0000 1100) 03 | Resume $2^{ND}$ level scan |
| 2 - $Serial_{1-16}$ | xx xx (0001 0000) 03 | |
| 2 - $Serial_{1-16}$ | | Scan though next 58 combinations |
| 2 - $Serial_{1-16}$ | xx xx (1111 1100) 03 | End of $2^{ND}$ level scan stage |

-continued

| Scan level | Scan serial | Comment |
| --- | --- | --- |
| 1 - Serial$_{1-10}$ | xx xx (xxxx xx00) 04 | Resume 1$^{ST}$ level scan |
| 1 - Serial$_{1-10}$ | xx xx (xxxx xx00) 05 | |
| 1 - Serial$_{1-10}$ | xx xx (xxxx xx00) 06 | Found device C, assign unique simplified address number |
| 1 - Serial$_{1-10}$ | xx xx (xxxx xx00) 07 | |
| 1 - Serial$_{1-10}$ | | Scan though next 25 combinations |
| 1 - Serial$_{1-10}$ | xx xx (xxxx xx00) 21 | |
| 1 - Serial$_{1-10}$ | xx xx (xxxx xx00) 22 | Found device F, assign unique simplified address number |
| 1 - Serial$_{1-10}$ | xx xx (xxxx xx00) 23 | |
| 1 - Serial$_{1-10}$ | | Scan though next 321 combinations |
| 1 - Serial$_{1-10}$ | xx xx (xxxx xx01) 65 | |
| 1 - Serial$_{1-10}$ | xx xx (xxxx xx01) 66 | Devices G and I reply - data corruption |
| 2 - Serial$_{1-16}$ | xx xx (0000 0001) 66 | 2$^{ND}$ level scan initiated |
| 2 - Serial$_{1-16}$ | xx xx (0000 0101) 66 | |
| 2 - Serial$_{1-16}$ | | Scan though next 23 combinations |
| 2 - Serial$_{1-16}$ | xx xx (0110 0101) 66 | |
| 2 - Serial$_{1-16}$ | xx xx (0110 1001) 66 | Devices G and I reply - data corruption |
| 3 - Serial$_{1-24}$ | xx 00 (0110 1001) 66 | 3$^{RD}$ level scan initiated |
| 3 - Serial$_{1-24}$ | xx 01 (0110 1001) 66 | |
| 3 - Serial$_{1-24}$ | | Scan though next 66 combinations |
| 3 - Serial$_{1-24}$ | xx 44 (0110 1001) 66 | |
| 3 - Serial$_{1-24}$ | xx 45 (0110 1001) 66 | Devices G and I reply - data corruption |
| 4 - Serial$_{1-32}$ | 00 45 (0110 1001) 66 | 4$^{TH}$ level scan initiated |
| 4 - Serial$_{1-32}$ | 01 45 (0110 1001) 66 | Found device G, assign unique simplified address number |
| 4 - Serial$_{1-32}$ | 02 45 (0110 1001) 66 | Found device I, assign unique simplified address number |
| 4 - Serial$_{1-32}$ | 03 45 (0110 1001) 66 | |
| 4 - Serial$_{1-32}$ | | Scan though next 251 combinations |
| 4 - Serial$_{1-32}$ | FF 45 (0110 1001) 66 | End of 4$^{th}$ level scan stage |
| 3 - Serial$_{1-24}$ | xx 46 (0110 1001) 66 | Resume 3$^{RD}$ level scan |
| 3 - Serial$_{1-24}$ | | Scan though next 184 combinations |
| 3 - Serial$_{1-24}$ | xx FF (0110 1001) 66 | End of 3$^{RD}$ level scan stage |
| 2 - Serial$_{1-16}$ | xx xx (0110 1101) 66 | Resume 2$^{ND}$ level scan |
| 2 - Serial$_{1-16}$ | | Scan though next 35 combinations |
| 2 - Serial$_{1-16}$ | xx xx (1111 1101) 66 | End of 2$^{ND}$ level scan stage |
| 1 - Serial$_{1-10}$ | xx xx (xxxx xx01) 67 | Resume 1$^{ST}$ level scan. Found device H, assign unique simplified address number |
| 1 - Serial$_{1-10}$ | xx xx (xxxx xx01) 68 | |
| 1 - Serial$_{1-10}$ | | Scan though next 662 combinations |
| 1 - Serial$_{1-10}$ | xx xx (xxxx xx11) FF | End of scan |

It will be appreciated, that with more than nine devices, the scanning will be more complex, but the principle is the same. Namely, a first level scan is carried out with the least significant digits of the serial numbers of the known range, and is stopped should a data collision occur. Scanning then resumes at a higher level, proceeding to the next higher level should a data collision occur again, until eventually no collision is detected in each level, the serial number of the corresponding device noted, and all of the devices have been identified in this way.

It will thus be appreciated that instead of using a method of identifying the devices whilst trying to avoid data collisions, which would be very time consuming, and involving scanning of all possible combination of serial numbers, the present invention specifically relies on the identification of erroneous data as a means of determining the next course of action, namely modifying the number of bits used during a scan to increase the scan resolution as appropriate.

The method of the invention will rapidly assign simple, user-controlled identification addresses to all devices on a communication loop (or within a communications range) without significant user intervention or reliance. This is done by use of a determinate method of scanning all possible combinations, or preferably by execution of an intelligent scan with a truncated number of queries, using identification of erroneous data packets as a means to determine the next course of action, usually resulting with adaptation of the number of bits used during the scan to increase the scan resolution as appropriate.

As all devices on a communication loop (or within a communications range) must be uniquely identifiable, the method of the invention provides all such devices with a simplified unique address number that an end-user can work with. It is easier and more reliable for operators to work with short, narrow range, consecutive number ranges than a lengthy, wide ranging and fragmented serial number.

It will be apparent that modifications could be made to the method described above. Thus the unique simplified address number of each device can be pre-programmed at the factory to be at a reserved value, one which cannot be used as a valid operating address. Each device can be programmed to disallow configuration once the address has been set to a valid value. Alternatively, the reply message could also return the unique simplified address number. Thus, if desired, the control panel could take on the responsibility of determining whether or not a given device has already been configured. The unique simplified address number on some devices on a loop can be reset back to a default state to allow a rescan and reassignment of the simplified unique address number of just those devices. This can be extended to all devices on the loop if necessary.

The invention claimed is:

1. A method of identifying by a control station a plurality of devices communicating along a common communications link, wherein each of the plurality of devices bears a unique identification number, the method comprising:

(a) sending by the control station a broadcast identification command via the communications link, the broadcast identification command including an identifier and an identification number, the identifier indicative to a respective device of the plurality of devices to ignore the broadcast identification command if the respective device of the plurality of devices has a control station assigned address and to process the broadcast identification command by comparing the identification number with at least a part of the unique identification number and sending a response to the control station if the identification number matches with at least a part of the unique identification number if the respective device of the plurality of devices does not have a control station assigned address;

(b) determining whether none, one, or more than one response was received in response to sending the broadcast identification command;

(c) if more than one response was received, modifying the identification number and transitioning to (a) by sending an updated broadcast identification command including the identifier and the modified identification number;

(d) if one response was received, sending an assigning command to the device that sent the response, the assigning command includes a control station assigned address, the control station assigned address being different than the unique identification number; and (e) if no responses were received, selecting a different identification number and transitioning to (a) by sending an updated broadcast identification command including the identifier and the different identification number, wherein the control station iterates through (a)-(e) until the control station assigns a control station assigned address to each of the plurality of devices.

2. The method of claim 1, wherein the identification number comprises a first set of bits constituted by the least significant bits of the identification numbers.

3. The method of claim 2, wherein the modified identification number comprises the set of bits and at least one additional bit constituted by a next least significant bit of the identification numbers.

4. The method of claim 1, wherein the identification number has a first number of bits;
wherein the unique identification number has a second number of bits; and
wherein the first number of bits is less than the second number of bits.

5. The method of claim 1, wherein the identification number is a hexadecimal number.

6. The method of claim 1, wherein the identification number is a binary number.

7. The method of claim 1, wherein the identification number is an alphanumeric number.

8. A control station for communicating with a plurality of devices communicating along a common communications link, wherein each device bears a unique identification number, the control station comprising:
a processor;
a memory in communication with the processor;
an I/O device in communication with the processor, wherein the processor is configured to:

(a) send a broadcast identification command via the I/O device, the broadcast identification command including an identifier and an identification number, the identifier indicative to a respective device of the plurality of devices to ignore the broadcast identification command if the respective device of the plurality of devices has a control station assigned address and to process the broadcast identification command by comparing the identification number with at least a part of the unique identification number and sending a response to the control station if the identification number matches with at least a part of the unique identification number if the respective device of the plurality of devices does not have a control station assigned address;

(b) determine whether none, one, or more than one response was received by the I/O device in response to sending the broadcast identification command;

(c) if more than one response was received, modify the identification number and transitioning to (a) by sending an updated broadcast identification command including the identifier and the modified identification number;

(d) if one response was received, send an assigning command to the device that sent the response, the assigning command includes a control station assigned address, the control station assigned address being different than the unique identification number; and (e) if no responses were received, select a different identification number and transitioning to (a) by sending an updated broadcast identification command including the identifier and the different identification number, wherein the processor iterates through (a)-(e) until the control station assigns a control station assigned address to each of the plurality of devices.

9. The control station of claim 8, wherein the identification number comprises a first set of bits constituted by the least significant bits of the identification numbers.

10. The control station of claim 9, wherein the modified identification number comprises the set of bits and at least one additional bit constituted by a next least significant bit of the identification numbers.

11. The control station of claim 8, wherein the identification number has a first number of bits;
wherein the unique identification number has a second number of bits; and
wherein the first number of bits is less than the second number of bits.

12. The control station of claim 8, wherein the identification number is a hexadecimal number.

13. The control station of claim 8, wherein the identification number is a binary number.

14. The control station of claim 8, wherein the identification number is an alphanumeric number.

15. The method of claim 1, wherein the control station assigned address is simpler than the unique identification number.

16. The control station of claim 8, wherein the control station assigned address is simpler than the unique identification number.

* * * * *